United States Patent
Moine

(10) Patent No.: US 12,554,270 B2
(45) Date of Patent: Feb. 17, 2026

(54) THROTTLE VALVE BODY ASSEMBLY WITH COMPENSATED CONTROL

(71) Applicant: VITESCO TECHNOLOGIES GMBH, Regensburg (DE)

(72) Inventor: Xavier Moine, Toulouse (FR)

(73) Assignee: VITESCO TECHNOLOGIES GMBH, Regensburg (DE)

( * ) Notice: Subject to any disclaimer, the term of this patent is extended or adjusted under 35 U.S.C. 154(b) by 391 days.

(21) Appl. No.: 18/028,657

(22) PCT Filed: Jan. 6, 2022

(86) PCT No.: PCT/EP2022/050200
§ 371 (c)(1),
(2) Date: Mar. 27, 2023

(87) PCT Pub. No.: WO2022/161753
PCT Pub. Date: Aug. 4, 2022

(65) Prior Publication Data
US 2023/0333574 A1  Oct. 19, 2023

(30) Foreign Application Priority Data
Jan. 27, 2021  (FR) ........................................ 2100750

(51) Int. Cl.
*G05D 7/06* (2006.01)
(52) U.S. Cl.
CPC ......... *G05D 7/0623* (2013.01); *G05D 7/0635* (2013.01)
(58) Field of Classification Search
CPC ............. G05D 7/0623; G05D 7/0635; B60W 2510/0604; B60W 2510/0657; F02D 2009/022; F02D 2009/0235
See application file for complete search history.

(56) References Cited

U.S. PATENT DOCUMENTS

| 5,333,584 | A |   | 8/1994 | Kamio et al. |
| 5,431,141 | A | * | 7/1995 | Kanazawa ............. B60K 26/04 123/399 |

(Continued)

FOREIGN PATENT DOCUMENTS

| CN | 101753073 | 6/2010 |
| CN | 102104361 | 6/2011 |

(Continued)

OTHER PUBLICATIONS

International Search Report and Written Opinion of the ISA for PCT/EP2022/050200, mailed May 4, 2022, 15 pages.

(Continued)

*Primary Examiner* — Stacey A Fluhart
(74) *Attorney, Agent, or Firm* — NIXON & VANDERHYE

(57) ABSTRACT

A combustion engine throttle body includes an air circulation duct with a throttle valve rotationally mounted therein, a DC electric motor opening or closing of the throttle valve and includes a rotor having a cogging torque that oscillates with a predefined period. A position sensor measures the throttle valve position. An electronic control unit receives the position values of the throttle valve, calculates a throttle valve compensation angle value between zero and the value of the predefined period of the cogging torque from the measured opening angle of the throttle valve, from the predefined period value of the cogging torque, and from the predetermined angle correction value for the throttle valve, determines a command signal value for the electric motor from a predetermined correspondence table and from the calculated compensation angle value for the throttle valve, and commands the electric motor based on the determined command signal value.

20 Claims, 4 Drawing Sheets

(56) References Cited

U.S. PATENT DOCUMENTS

| | | | |
|---|---|---|---|
| 5,444,341 | A | 8/1995 | Kneifel, II et al. |
| 6,299,129 | B1 * | 10/2001 | Suzuki ................ H02K 26/00 |
| | | | 251/129.09 |
| 8,058,827 | B2 | 11/2011 | Iwashita et al. |
| 2011/0084636 | A1 | 4/2011 | Kyllingstad |
| 2011/0147028 | A1 | 6/2011 | Iwashita et al. |

FOREIGN PATENT DOCUMENTS

| | | |
|---|---|---|
| CN | 102403937 A | 4/2012 |
| CN | 103814517 | 5/2014 |
| CN | 107453659 | 12/2017 |
| CN | 108448978 | 8/2018 |
| CN | 108540021 | 9/2018 |
| CN | 111669081 A | 9/2020 |
| JP | H9-60547 | 3/1997 |
| JP | 2000297660 A * | 10/2000 |
| JP | 2003184584 A * | 7/2003 |
| JP | 2004-270563 | 9/2004 |
| JP | 2011176950 A | 9/2011 |
| JP | 2013-240264 | 11/2013 |
| JP | 2017-175777 | 9/2017 |
| TW | 201541850 | 11/2015 |
| WO | 2014115767 A1 | 7/2014 |

OTHER PUBLICATIONS

Notice of Allowance, issued in China Patent Application No. 202280011776.6 dated Aug. 29, 2025.
Office Action, issued in India Patent Application No. 202347023993 dated Oct. 28, 2025.

* cited by examiner

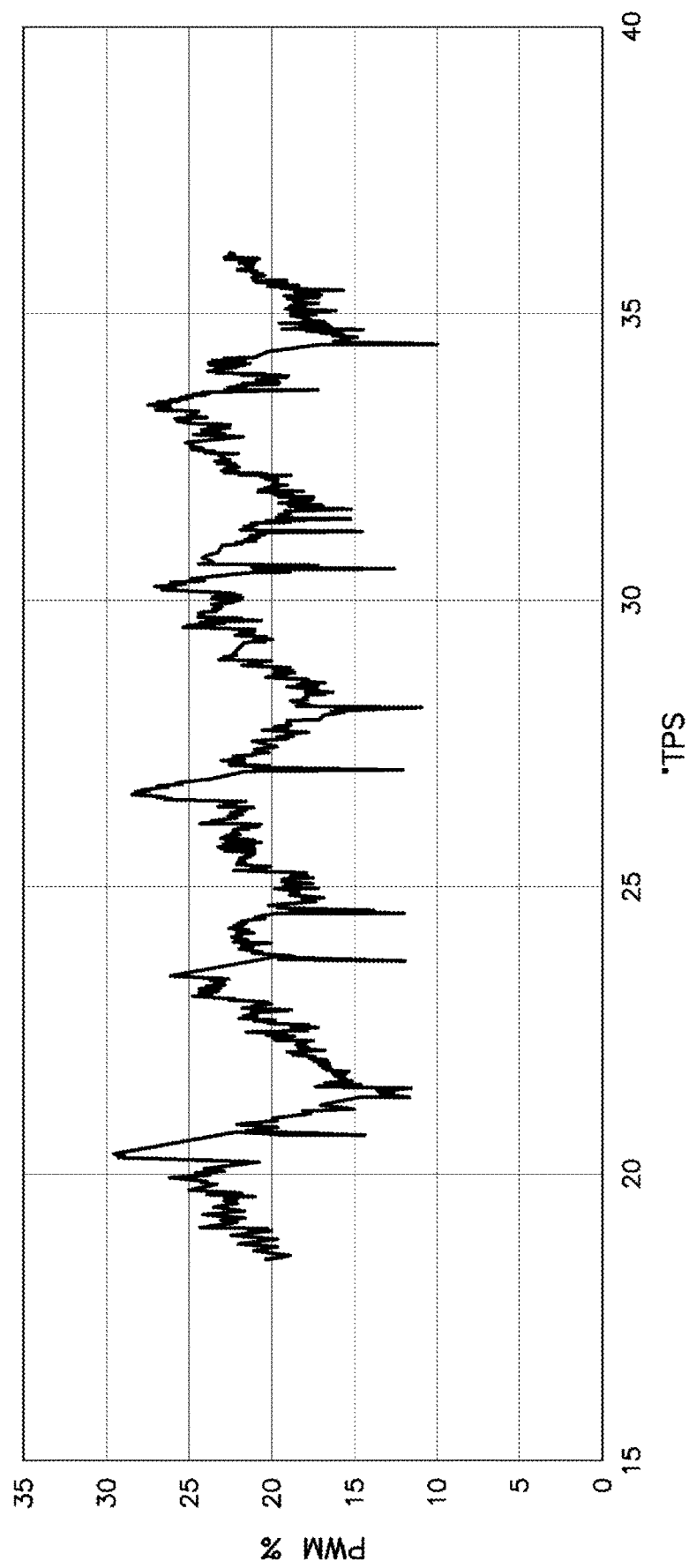

THROTTLE VALVE BODY ASSEMBLY WITH COMPENSATED CONTROL

CROSS-REFERENCE TO RELATED APPLICATIONS

This application is the U.S. national phase of International Application No. PCT/EP2022/050200 filed Jan. 6, 2022 which designated the U.S. and claims priority to FR Patent Application No. 2100750 filed Jan. 27, 2021, the entire contents of each of which are hereby incorporated by reference.

BACKGROUND OF THE INVENTION

Field of the Invention

The present invention relates to the technical field of machines having a combustion engine and more particularly to a computer and to a method for commanding an electric motor for controlling the opening of an air intake throttle in a combustion engine. The invention notably aims to improve the precision of the control of the air intake throttle.

Description of the Related Art

Certain machines or certain vehicles having a combustion engine have a body referred to as "throttle", which makes it possible to control the intake of air into the one or more cylinders of said combustion engine. For example, this is the case for certain lawn tractors, certain electric current generators having a combustion engine, or certain motorcycles.

In a known manner, a throttle body has a throttle mounted on an axis of rotation, an electric motor for commanding the opening or the closing of the throttle, a sensor for determining the position of the throttle, and an electronic control unit for receiving the position values measured by the sensor and for commanding the electric motor to open or close the throttle as a function of the position of said throttle and on a value for the volume of air to be taken into the one or more cylinders of the combustion engine. The electric motor is commanded, for example, using signals of pulse width modulation (PWM) type.

In certain valve bodies that are currently in use, the DC electric motor has a cylindrical rotor having helical electromagnetic blades. Such a motor is efficient but has proven notably to be expensive to manufacture.

In order to at least partially overcome this drawback, it is known to use a DC electric motor having a cylindrical rotor having carriers that extend over the height of the cylinder. An electromagnetic coil is wound on each carrier and the carriers are separated in pairs by a slot, such an arrangement making it possible to reduce the manufacturing costs of the electric motor.

However, in this type of electric motor, it has been noted that the slots of the cylinder generate a parasitic torque, referred to as "cogging torque", which disrupts the control signals and can lead to an erroneous position of the throttle and therefore the intake of an incorrect volume of air into the combustion engine. More specifically, the parasitic torque decreases or increases the value for the command current signal of the electric motor, this leading to the throttle being actuated to an insufficient or excessive extent. This phenomenon is described, for example, in document US2011147028A1 which, however, does not relate to a throttle body but solely to the commanding of a DC electric motor. Document US2011147028A1 specifies that the cogging torque oscillates with a predefined period. To counteract this cogging torque phenomenon, document US2011147028A1 describes feedback control based on a corrector of PID (Proportional, Integral, Derivative) type and the use of Fourier transforms. Since such feedback control requires significant calculations notably owing to the use of Fourier transforms, it has proven to be particularly slow and unsuitable for implementation by a throttle body electronic control unit, the processing capabilities of which are limited notably for cost reasons.

There is therefore a need for a solution that can be used to at least partially overcome these drawbacks.

SUMMARY OF THE INVENTION

To that end, the invention first of all relates to a throttle body for a machine having a combustion engine, said throttle body comprising an air circulation duct, a throttle valve mounted on an axis of rotation in said air circulation duct, a DC electric motor that is able to command the opening or the closing of the throttle valve via a geartrain and comprises a rotor characterized by a cogging torque that oscillates with a predefined period when said rotor is driven in rotation and by a predetermined angle correction value for the throttle valve corresponding to the angle value to be applied to the actual position of the throttle valve in order to compensate the cogging torque on average, a position sensor able to measure the position of said throttle valve, and an electronic control unit able to:
  receive the position values of the throttle valve that were measured by the sensor,
  calculate a compensation angle value for the throttle valve of between zero and the value of the predefined period of the cogging torque from the measured opening angle of the throttle valve, from the predefined period value of the cogging torque, and from the predetermined angle correction value for the throttle valve,
  determine a value for a command signal for the electric motor from a predetermined correspondence table and from the calculated compensation angle value for the throttle valve,
  command the electric motor on the basis of the determined command signal value.

The throttle body according to the invention thus makes it possible to instantaneously calculate and apply a compensated command signal value taking account of the cogging torque depending on the position of the throttle valve. The use of a correspondence table significantly reduces the number of calculations compared to the feedback control solution of the prior art cited above and makes it possible to rapidly and effectively compensate the command signal as a function of the position of the throttle valve. As a result, the throttle body constitutes a simple, reliable, effective and low-cost solution that can be used in machines or vehicles having a combustion engine of tractor, lawnmower, electricity generator or motorcycle type.

According to one aspect of the invention, the electronic control unit comprises a memory area and is able to command the rotation of the rotor of the electric motor for a plurality of revolutions, to identify and store, in its memory area, that position of the throttle valve that corresponds to the maximum value for the command signal sent to the electric motor and to calculate the average of the position values stored that then corresponds to the angle correction value for the throttle valve.

Advantageously, the electronic control unit is able to eliminate the maximum and minimum position values before calculating the average of the position values stored in order to improve the precision of the use of the angle correction value for the throttle valve.

More advantageously still, the electronic control unit is able to command the electric motor on the basis of a pulse width modulated signal, which is a type of signal that is effective for commanding a DC electric motor.

The invention also relates to a machine having a combustion engine comprising a throttle body as described above.

According to one aspect of the invention, the machine is a vehicle of tractor type, a lawnmower, an electricity generator having a combustion engine, or a vehicle of motorcycle type.

The invention also relates to a method for commanding a DC electric motor of a throttle body as described above of a machine having a combustion engine, said electric motor being characterized by a cogging torque that oscillates with a predefined period and by a predetermined angle correction value for the throttle valve, the method comprising the following steps:
- using the sensor to measure the opening angle of the throttle valve,
- using the electronic control unit to calculate a compensation angle value for the throttle valve of between zero and the value of the predefined period of the cogging torque from the measured opening angle of the throttle valve, from the predefined period value of the cogging torque, and from the predetermined angle correction value for the throttle valve,
- using the electronic control unit to determine a value for a command signal for the electric motor from a predetermined correspondence table and from the calculated compensation angle value for the throttle valve,
- using the electronic control unit to command the electric motor on the basis of the determined command signal value.

According to one aspect of the invention, the method moreover comprises a preliminary step of commanding the rotation of the rotor of the electric motor for a plurality of revolutions, of identifying and storing that position of the throttle valve that corresponds to the maximum value for the command signal sent to the electric motor and calculating the average of the position values stored that then corresponds to the angle correction value for the throttle valve.

Preferably, the maximum and minimum position values are removed before calculating the average in order to improve the precision of the use of the angle correction value for the throttle valve.

More preferably still, the electronic control unit commands the electric motor on the basis of a pulse width modulated signal, which is a type of signal that is effective for commanding a DC electric motor.

The invention also relates to a computer program product comprising a set of program code instructions stored on a medium readable by an electronic control unit for implementing a method as presented above when said program is run on the electronic control unit.

BRIEF DESCRIPTION OF THE DRAWINGS

Further features and advantages of the invention will become more clearly apparent on reading the following description. This description is purely illustrative and should be read with reference to the appended drawings, in which:

FIG. 4 is an example of a command signal made noisy by a cogging torque of the electric motor of the throttle body.

DESCRIPTION OF THE PREFERRED EMBODIMENTS

The throttle body according to the invention is intended to be mounted in a machine having a combustion engine, for example a vehicle of tractor type, a lawnmower, an electric current generator having a combustion engine, or a vehicle of motorcycle type.

Figure 1:
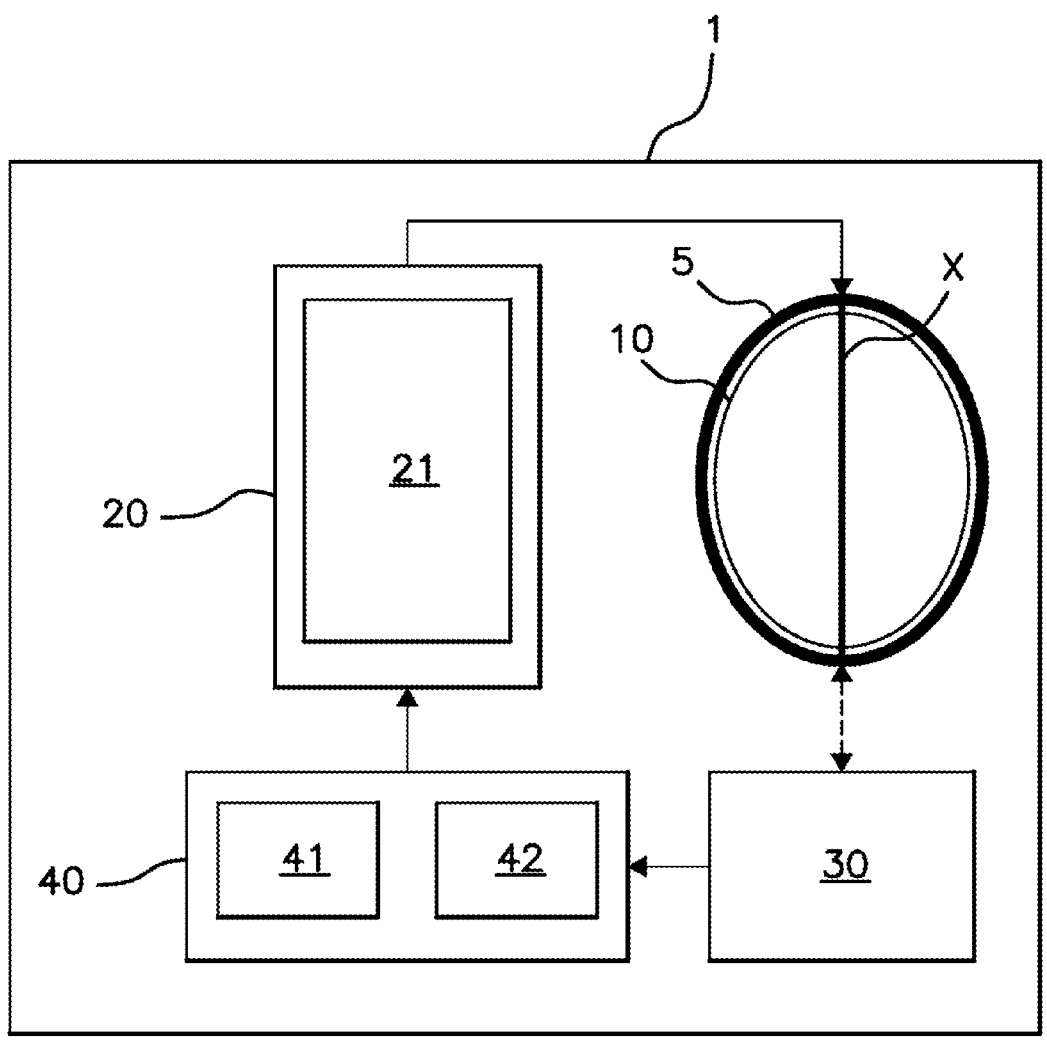
FIG. 1 schematically illustrates one embodiment of the throttle body according to the invention.

FIG. 1 shows an example of a throttle body 1 according to the invention.

The throttle body 1 comprises an air circulation duct 5, a throttle valve 10, a DC electric motor 20, a position sensor 30, and an electronic control unit 40.

The throttle valve 10 is mounted on an axis of rotation X in the air circulation duct 5 in order to be able to be moved between a closed position, in which it blocks said air circulation duct, and a plurality of open positions, each characterized by an opening angle. An opening angle of zero conventionally corresponds to the closed position.

The electric motor 20 is able to command the opening or closing of the throttle valve 10 via a geartrain (not shown) in a manner which is known per se. The electric motor 20 has a rotor 21 which is characterized by a cogging torque that oscillates with a predefined period when said rotor is driven in rotation and by a predetermined angle correction value for the throttle valve. The predefined period depends on the design of the motor (number of poles) and on the transmission ratio of the geartrains. The predefined period can be measured, for example, in the factory or in a laboratory.

The angle correction value for the throttle valve corresponds to the angle value to be applied to the actual position of the throttle valve in order to compensate the cogging torque on average. In other words, the angle correction value for the throttle valve makes it possible to compensate the average error generated by the cogging torque in the position of the throttle valve, but does not make it possible to compensate the instantaneous error caused by the cogging torque in the commanding of the electric motor 20. The angle correction value for the throttle valve is a fixed value that can be calculated during a preliminary step in order to compensate the commanding of the electric motor 20, as will be described below.

The sensor 30 is able to measure the position of the throttle valve 10, that is to say the opening angle of the throttle valve 10, and to supply the position values measured to the electronic control unit 40.

The electronic control unit 40 is able to receive the position values of the throttle valve 10 that were measured by the sensor 30 and to command the electric motor 20 to open or close the throttle valve 10 as a function of the position of said throttle valve 10 and a value for the volume of air to be taken into the one or more cylinders of the combustion engine of the machine. The electric motor 20 is commanded, for example, using signals of pulse width modulation (PWM) type. When the electronic control unit 40 commands the electric motor 20 with a constant position value (please confirm), the PWM command signal received and applied by the electric motor 20 to the rotor 21, which corresponds to the command necessary to keep the throttle valve 10 in a fixed position, in reality exhibits variations generated by the cogging torque between a maximum and a minimum for each revolution of the rotor 21, as illustrated for example in FIG. 4 for five predefined periods of the cogging torque of the rotor 21.

According to the invention, the electronic control unit 40 is able to calculate a compensation angle value for the throttle valve 10 of between zero and the value of the predefined period of the cogging torque from the measured opening angle of the throttle valve 10, from the predefined period value of the cogging torque, and from the predetermined angle correction value for the throttle valve 10. The electronic control unit 40 is able to determine a value for a command signal for the electric motor 20 from a predetermined correspondence table and from the calculated compensation angle value for the throttle valve 10 and to command the electric motor 20 on the basis of the determined command signal value. The correspondence table is determined in advance, for example in the factory or in a laboratory, and comprises a plurality of predetermined compensation angle values for the throttle valve 10 and a plurality of predetermined command signal values, each predetermined compensation angle value for the throttle valve 10 corresponding to a predetermined command signal value. The correspondence table can comprise only several predetermined compensation angle values for the throttle valve 10 and predetermined command signal values, or else several tens or even hundreds of predetermined compensation angle values for the throttle valve 10 and predetermined command signal values.

The electronic control unit 40 comprises a processor 41 and a memory area 42. The processor 41 is able to implement a set of instructions, stored in the memory area 42, for carrying out these various functions.

Figure 2:
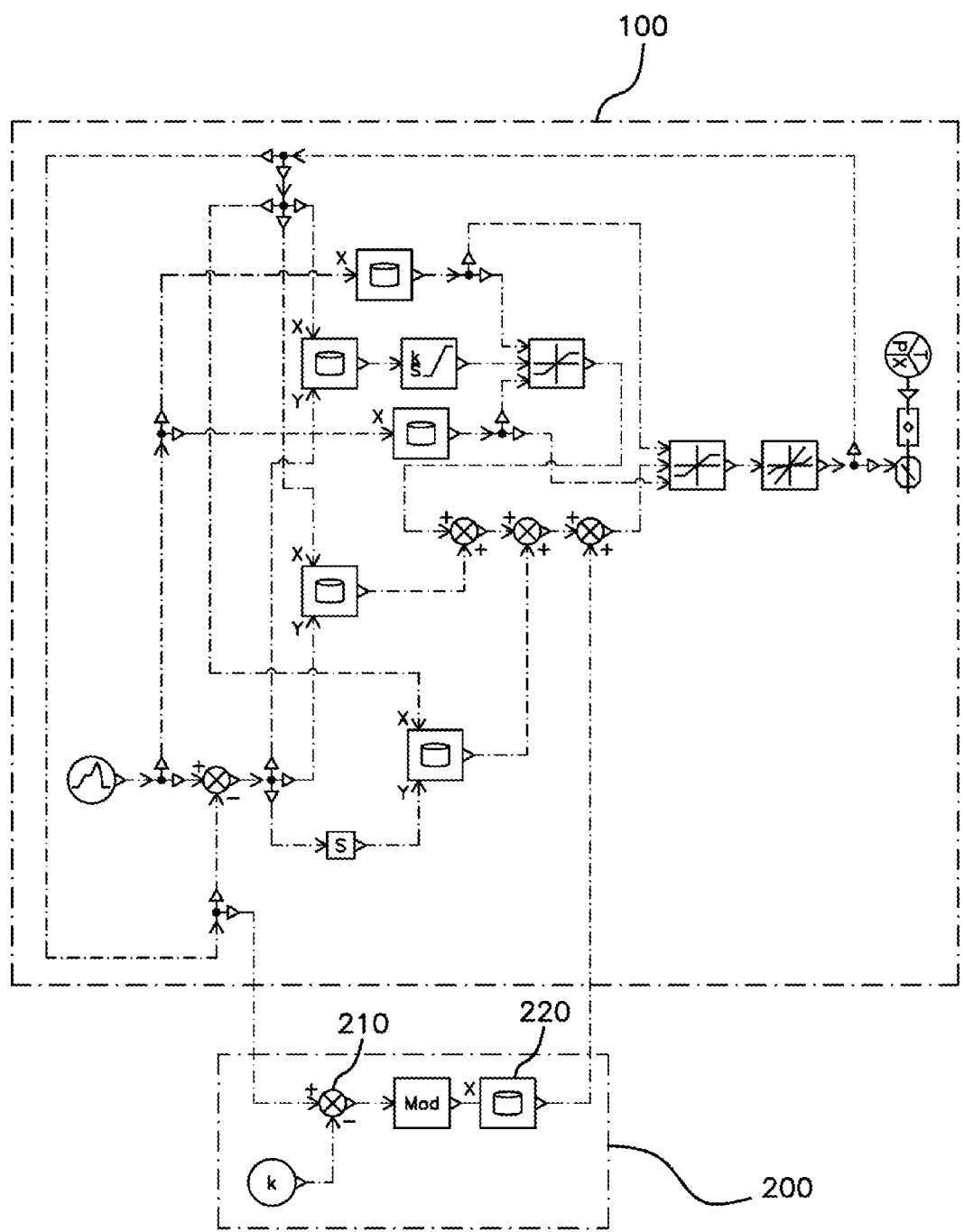
FIG. 2 is an example of a circuit for implementing the invention.

FIG. 2 shows an example of a circuit for implementing the invention. This circuit has a part of PID controller type 100 and a compensation module 200. The PID controller 100 is known per se and will not be described further here.

In this example, the compensation module 200 performs multiple functions of the electronic control unit 40 that was described above.

The compensation unit 200 comprises a unit k configured to store and supply the predetermined angle correction value for the throttle valve 10.

The compensation module 200 comprises a subtractor 210 for subtracting the predetermined angle correction value for the throttle valve 10 from the measured opening angle value of the throttle valve 10 that was received from the PID controller 100.

The compensation module 200 comprises a unit MOD configured to calculate a compensation angle value for the throttle valve 10 of between zero and the value of the predefined period of the cogging torque from the predefined period value of the cogging torque and from the value supplied by the subtractor 210.

The compensation module 200 also comprises a determination unit 220 configured to determine the value for a command signal for the electric motor 20 from a predetermined correspondence table and from the calculated compensation angle value for the throttle valve 10, supplied by the unit MOD, and to supply the determined value of the signal to the PID controller 100 to command the electric motor 20.

Figure 3:
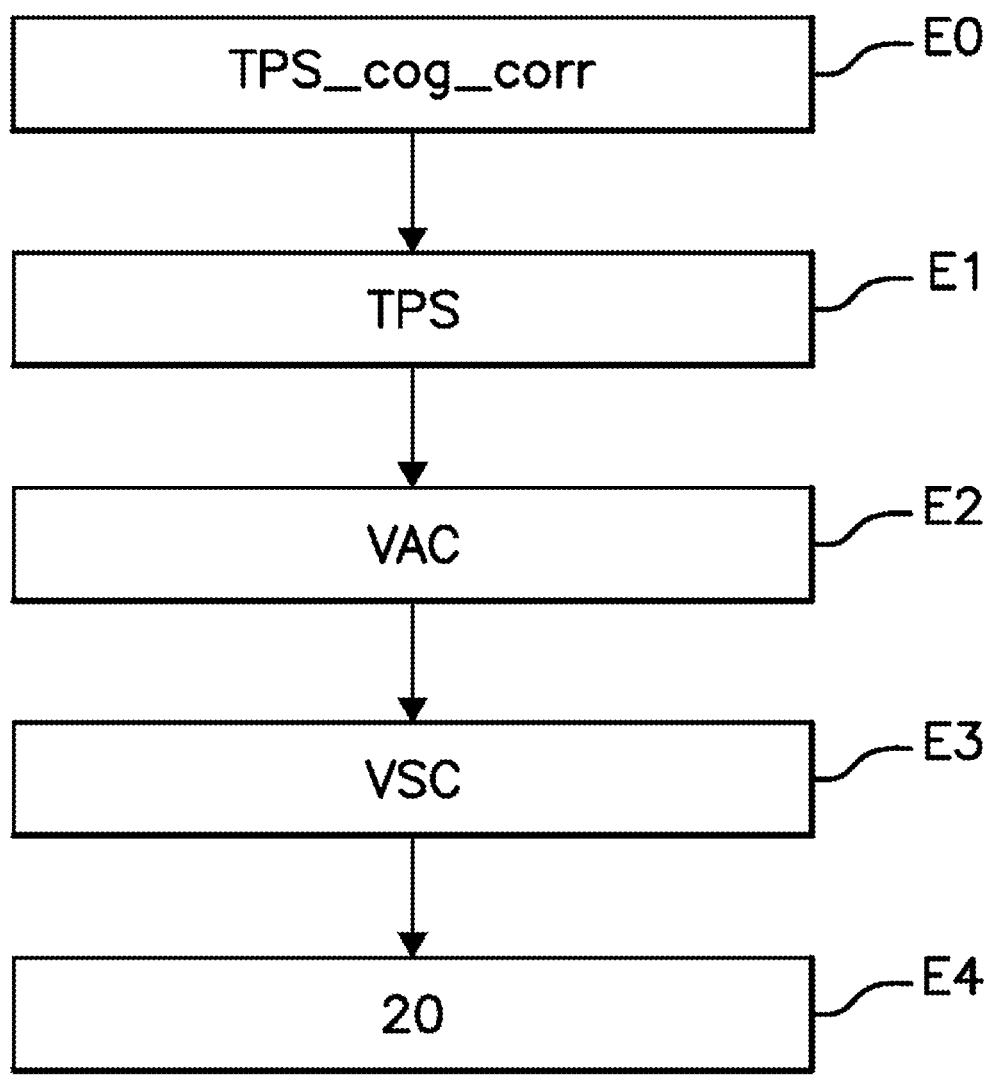
FIG. 3 illustrates an embodiment of the method according to the invention.

The invention will now be described in terms of the implementation thereof with reference to FIGS. 3 and 4.

In a preliminary step E0, the electronic control unit 40 determines the angle correction value for the throttle valve 10. To do this, the electronic control unit 40 first of all commands the slow rotation of the rotor of the electric motor 20 for several revolutions, for example five revolutions in the example of FIG. 4. For each slow rotation of the rotor 21, the sensor 30 measures the position of the throttle valve 10 and the electronic control unit 40 identifies and stores, in its memory area 42, the position of the throttle valve 10 that corresponds to the maximum value for the command signal sent to the electric motor 20. After five revolutions are completed, the electronic control unit 40 interrupts the commanding of the electric motor 20, eliminates the maximum value and the minimum value from the five position values measured modulo the predefined period and calculates the average from the remaining three position values in order to obtain the angle correction value for the throttle valve 10. Once it has been determined, for example in the factory or in a laboratory, the angle correction value for the throttle valve 10 is stored in the memory area 42 of the electronic control unit 40.

Subsequently, upon each operation of the combustion engine of the machine, the electronic control unit 40 implements the following steps.

First of all, in a step E1, the sensor 30 measures the opening angle of the throttle valve 10.

Then, in a step E2, the electronic control unit 40 calculates a compensation angle value for the throttle valve 10 of between zero and the value of the predefined period of the cogging torque from the measured opening angle of the throttle valve, from the predefined period value of the cogging torque, and from the predetermined angle correction value for the throttle valve.

Then, in a step E3, the electronic control unit 40 determines a value for a command signal for the electric motor 20 from the predetermined correspondence table and from the calculated compensation angle value for the throttle valve.

Lastly, in a step E4, the electronic control unit 40 commands the electric motor 20 on the basis of the determined command signal value in order to compensate the effects of the cogging torque in real time and instantaneously.

A numerical example will now be given in order to explain the implementation of the method according to the invention further.

In this example, the predefined period of the command signal subject to cogging is 3.2403°. The processor 41 of the electronic control unit 40 processes the data in the form of bits and the position values of the throttle valve (in degrees) are encoded over a range of 512 bits for a period of the command signal subject to cogging. The correspondence table has nine indexes: 0, 32, 64, 96, 128, 160, 192, 224 and 256, each index being associated with a predetermined command signal value.

With reference to FIG. 4, the measurement of the maximums for the five rotations of the rotor 21 lead to the following values:

TABLE 1

| Revolution | Position of the maximum (°) | Position of the maximum modulo the predefined period (°) |
|---|---|---|
| 1 | 20.34 | 0.42 |
| 2 | 23.42 | 0.18 |
| 3 | 26.6 | 0.04 |
| 4 | 30.19 | 0.31 |
| 5 | 33.35 | 0.15 |

The maximum position value of the maximum modulo the predefined period is 0.42. The minimum position value of the maximum modulo the predefined period is 0.04. The electronic control unit 40 then calculates the average of the other values (0.15; 0.18; and 0.31°), i.e. 0.21°) for a predefined period, which constitutes the angle correction value for the throttle valve 10 (step E0), referred to here as TPS_cog_corr.

When the combustion engine of the machine is operating, the electronic control unit 40 measures the opening angle of the throttle valve 10 (step E1).

Then, the electronic control unit 40 calculates a compensation angle value VAC for the throttle valve 10 of between zero and the value of the predefined period of the cogging torque from the measured opening angle TPS of the throttle valve, from the predefined period value PP of the cogging torque, and from the predetermined angle correction value TPS_cog_corr for the throttle valve: VAC=(TPS+PP−TPS_cog_corr)×FC modulo the predefined period, where FC represents a factor for transforming the compensation angle value VAC into an equivalent value in bits that can be exploited by the processor 41.

For example, for an opening angle TPS of the throttle valve of 10°, i.e. 10×512=5120 (with a resolution of the sensor for measuring the opening angle TPS of the throttle valve of $\frac{1}{512}$°), an FC value of 20225 and a predefined period PP of 3.2403°, the following applies: VAC=(5120+3.2403×512−0.21×512)×20225=X.

Multiplication by the factor FC makes it possible to obtain a result over four bytes.

Then, in a step E3, the electronic control unit 40 determines a value for a command signal for the electric motor 20 from the predetermined correspondence table and from the calculated compensation angle value for the throttle valve. To do this, the electronic control unit 40 reads the second of the four bytes starting from the right: the first three bits represent the index of the correspondence table and the last five bits represent the decimal fraction of the calculated compensation angle value for the throttle valve.

For example, if the first three bits indicate the index 160, the electronic control unit 40 reads the command signal value VSC corresponding to the index 160 in the correspondence table and adds a command signal value fraction equivalent to the decimal fraction of the calculated compensation angle value for the throttle valve (last five bits) to obtain the command signal value to be applied to the electric motor 20 in step E4 in order to effectively and instantaneously compensate the cogging torque as a function of the position of the throttle valve 10.

The invention claimed is:

1. A throttle body for a machine having a combustion engine, said throttle body comprising:
   an air circulation duct;
   a throttle valve mounted on an axis of rotation in said air circulation duct;
   a DC electric motor configured to command an opening or a closing of the throttle valve via a geartrain, the DC electric motor comprising
      a rotor having a cogging torque that oscillates with a predefined period when said rotor is driven in rotation,
      a position sensor configured to measure the position of said throttle valve, and
      an electronic control unit configured to:
         receive position values of the throttle valve measured by the sensor,
         calculate a compensation angle value for the throttle valve of between zero and a predefined period value corresponding to the predefined period of the cogging torque from a measured opening angle of the throttle valve, the predefined period value of the cogging torque, and a predetermined angle correction value for the throttle valve to correct,
         determine a value for a command signal for the electric motor from a predetermined correspondence table and the calculated compensation angle value for the throttle valve, and
         command the electric motor based on the determined command signal value.

2. The throttle body as claimed in claim 1, wherein the electronic control unit comprises a memory area and is configured to command the rotation of the rotor of the electric motor for a plurality of revolutions, to identify and store, in the memory area, the position of the throttle valve that corresponds to a maximum value for the command signal sent to the electric motor and to calculate the average of the position values stored that corresponds to the angle correction value for the throttle valve.

3. The throttle body as claimed in claim 2, wherein the electronic control unit is configured to command the electric motor based on a pulse width modulated signal.

4. A machine comprising:
   a combustion engine comprising the throttle body as claimed in claim 2.

5. A method for commanding the DC electric motor of the throttle body as claimed in claim 2 of the machine having the combustion engine, the method comprising:
   using the position sensor to measure the opening angle of the throttle valve;
   using the electronic control unit to calculate the compensation angle value for the throttle valve of between zero and the predefined period value corresponding to the predefined period of the cogging torque from the measured opening angle of the throttle valve, the predefined period value of the cogging torque, and the predetermined angle correction value for the throttle valve;
   using the electronic control unit to determine the value for the command signal for the electric motor from the predetermined correspondence table and the calculated compensation angle value for the throttle valve; and
   using the electronic control unit to command the electric motor based on the determined command signal value.

6. The throttle body as claimed in claim 1, wherein the electronic control unit is configured to command the electric motor based on a pulse width modulated signal.

7. A machine comprising:
   a combustion engine comprising the throttle body as claimed in claim 6.

8. A method for commanding the DC electric motor of the throttle body as claimed in claim 6 of the machine having the combustion engine, the method comprising the following steps:
   using the position sensor to measure the opening angle of the throttle valve;
   using the electronic control unit to calculate the compensation angle value for the throttle valve of between zero and the predefined period value corresponding to the predefined period of the cogging torque from the measured opening angle of the throttle valve, the predefined period value of the cogging torque, and the predetermined angle correction value for the throttle valve;
   using the electronic control unit to determine the value for the command signal for the electric motor from the predetermined correspondence table and the calculated compensation angle value for the throttle valve; and using the electronic control unit to command the electric motor based on the determined command signal value.

9. A machine comprising:
a combustion engine comprising the throttle body as claimed in claim 1.

10. The machine as claimed in claim 9, wherein said machine is one of a tractor vehicle, a lawnmower, an electricity generator having a combustion engine, and a motorcycle vehicle.

11. A method for commanding the DC electric motor of the throttle body as claimed in claim 1 of the machine having the combustion engine, the method comprising:
using the position sensor to measure the opening angle of the throttle valve;
using the electronic control unit to calculate the compensation angle value for the throttle valve of between zero and the predefined period value corresponding to the predefined period of the cogging torque from the measured opening angle of the throttle valve, the predefined period value of the cogging torque, and the predetermined angle correction value for the throttle valve;
using the electronic control unit to determine the value for the command signal for the electric motor from the predetermined correspondence table and the calculated compensation angle value for the throttle valve; and
using the electronic control unit to command the electric motor based on the determined command signal value.

12. The method as claimed in claim 11, further comprising, prior to using the position sensor to measure the opening angle of the throttle valve:
commanding the rotation of the rotor of the electric motor for a plurality of revolutions;
identifying and storing a position of the throttle valve that corresponds to a maximum value for the command signal sent to the electric motor; and
calculating the average of the position values stored that corresponds to the angle correction value for the throttle valve.

13. The method as claimed in claim 12, wherein the maximum position value and a minimum position value are removed before the average is calculated.

14. The method as claimed in claim 13, wherein the electronic control unit commands the electric motor based on a pulse width modulated signal.

15. A non-transitory medium on which is stored a computer program comprising a set of program code instructions stored on a medium readable by an electronic control unit that implements the method of claim 13 when said program is run on said electronic control unit.

16. The method as claimed in claim 12, wherein the electronic control unit commands the electric motor based on a pulse width modulated signal.

17. A non-transitory medium on which is stored a computer program comprising a set of program code instructions stored on a medium readable by an electronic control unit that implements the method of claim 12 when said program is run on said electronic control unit.

18. The method as claimed in claim 11, wherein the electronic control unit commands the electric motor based on a pulse width modulated signal.

19. A non-transitory medium on which is stored a computer program comprising a set of program code instructions stored on a medium readable by an electronic control unit that implements the method of claim 18 when said program is run on said electronic control unit.

20. A non-transitory medium on which is stored a computer program comprising a set of program code instructions stored on a medium readable by an electronic control unit that implements the method of claim 6 when said program is run on said electronic control unit.

* * * * *